Figure 1:
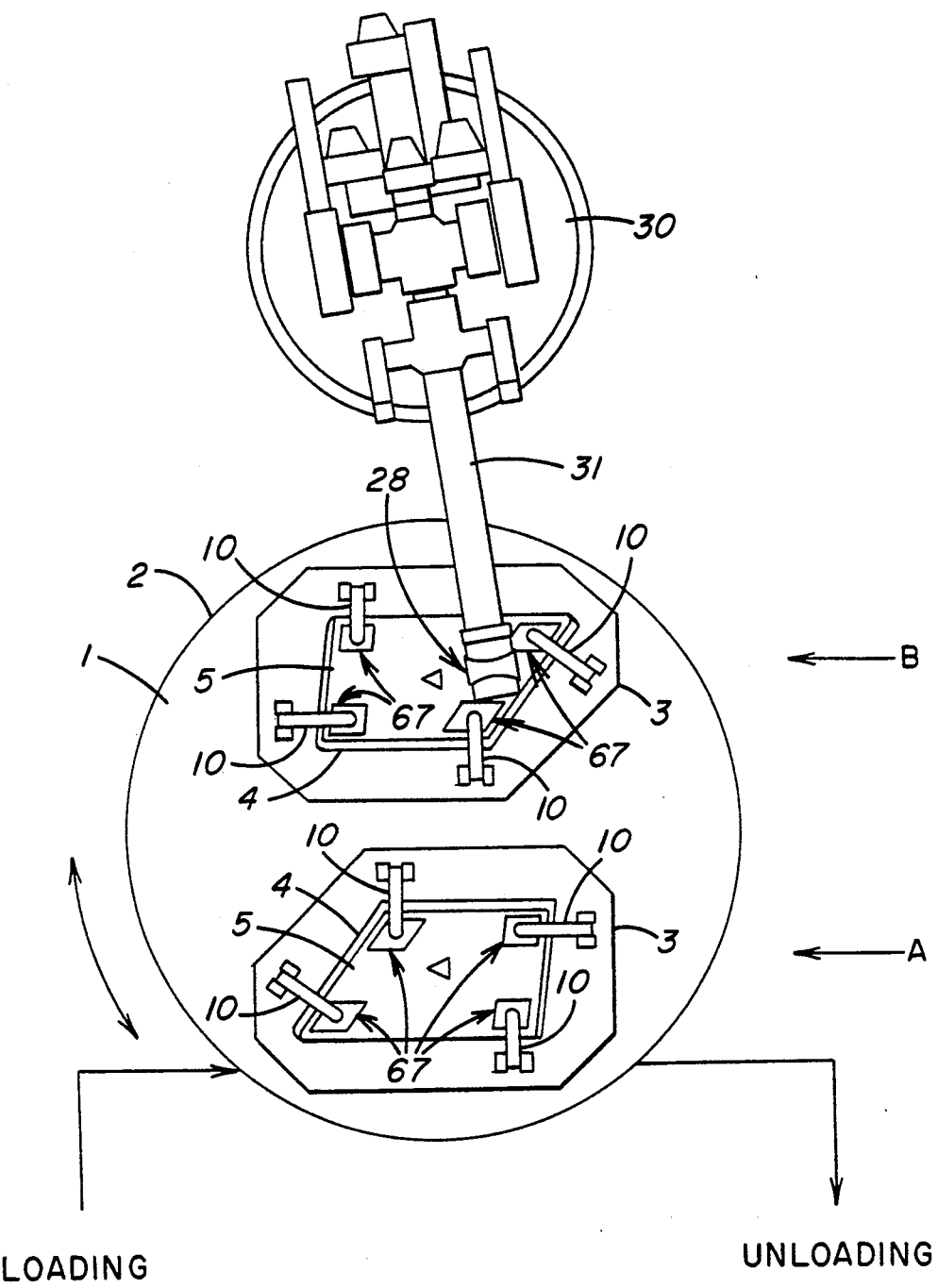

United States Patent [19]

Lenhardt

[11] Patent Number: 5,167,756
[45] Date of Patent: Dec. 1, 1992

[54] APPARATUS FOR JOINING TWO GLASS PANELS TO FORM A PANE OF INSULATING GLASS BONDED AT THE EDGE

[75] Inventor: Karl Lenhardt, Neuhausen-Hamberg, Fed. Rep. of Germany

[73] Assignee: PPG Industries, Inc., Pittsburgh, Pa.

[21] Appl. No.: 604,862

[22] Filed: Oct. 29, 1990

[30] Foreign Application Priority Data

Oct. 28, 1989 [DE] Fed. Rep. of Germany ....... 3935992

[51] Int. Cl.$^5$ ..................... B05C 13/02; B32B 31/04
[52] U.S. Cl. .................... 156/578; 156/107; 156/109; 156/356; 264/261; 269/21; 269/45
[58] Field of Search ............... 156/99, 107, 109, 578, 156/575, 356; 248/683, 131, 205.5–206.4, 309.3, 316.8, 349; 269/21, 57, 43, 45, 55; 198/345.1, 471.1, 689.1; 264/261

[56] References Cited

U.S. PATENT DOCUMENTS

| | | | |
|---|---|---|---|
| 3,391,805 | 7/1968 | Baden | 156/109 X |
| 3,647,043 | 3/1972 | Garretto | 269/57 X |
| 3,833,230 | 9/1974 | Noll | 269/21 X |
| 3,974,011 | 8/1976 | Jarchow et al. | 156/107 |
| 4,368,087 | 1/1983 | Valiment et al. | 156/99 X |
| 4,458,628 | 7/1984 | Fujii et al. | 118/109 X |
| 4,708,762 | 11/1987 | Lenhardt | 156/109 X |
| 4,957,318 | 9/1990 | Blatt | 248/205.9 X |
| 5,051,145 | 9/1991 | Lenhardt | 156/109 X |

Primary Examiner—Michael W. Ball
Assistant Examiner—Francis J. Lorin
Attorney, Agent, or Firm—Donald Carl Lepiane

[57] ABSTRACT

The apparatus joins two glass panels (4, 5) by injecting a strand of an initially pasty and subsequently solidifying compound along the edge of the pane into the intermediate space between the two initially unjoined glass panels. It has a horizontal conveyor, which has supporting or holding elements (6), which hold the glass panels (4, 5) parallel to each other and spaced apart, it being possible for the supporting or holding elements (6) acting on one of the glass panels (5) to be removed individually in sequence or in groups from said glass panel by an actuating device (7), thereby allowing a nozzle to be moved uninterruptedly between the two glass panels (4, 5) around the edge of the panel by an automatically operating handling apparatus (30), and wherein the nozzle can be swiveled about an axis running at a right angle to said panels. For receiving a plurality of pairs of glass panels (4, 5), supporting or holding elements (6, 13) are provided in a plurality of receiving devices moving step-by-step through a plurality of stopping positions (A, B, C) and arranged one behind the other in the direction of movement. In this arrangement, a first stopping position (A) is assigned a loading apparatus (41), a second stopping position (B) is assigned the handling apparatus (30) with the nozzle (32) and a further stopping position is assigned an unloading apparatus (41).

26 Claims, 9 Drawing Sheets

APPARATUS FOR JOINING TWO GLASS PANELS TO FORM A PANE OF INSULATING GLASS BONDED AT THE EDGE

The invention is based on an apparatus for joining two glass panels to form a pane of insulating glass bonded at the edges by injecting a strand of a compound which is initially pasty and subsequently solidifying and adhering to the two glass panels, along the edge of the pane into the intermediate space between the two initially unjoined glass panels, the apparatus includes a horizontal conveyor having supporting elements which act on at least one of the large surfaces of the two glass panes to hold them parallel to each other as the strand is injected between marginal edges of the panels. Such an apparatus is known from DE-35 39 877 A1. The known apparatus is suited quite well for the assembling of rectangular, flat panes of insulating glass, since they can easily and quickly be positioned congruently in parallel at a distance from each other on a horizontal conveyor by the means disclosed in DE-35 39 877 A1 and then be bonded to each other and sealed with a moving nozzle as they stay in the same place or with a stationary nozzle as they pass through. The known apparatus has a horizontal conveyor a horizontal row of driven rollers on which the individual glass panels stand upright and are leaned against a support with one of their large surfaces For the first glass panel of a pair of glass panels, the support is an array of rollers, for the second glass panel of a pair of glass panels it is a horizontal row of rollers arranged ahead of the array of rollers. For positioning the glass panels, first of all the first glass panel is made to run into the apparatus and is conveyed up to a stop. Then, the horizontal conveyor is displaced backward parallel to itself by the amount by which the row of supporting rollers is ahead of the array of supporting rollers. If the second glass panel then runs into the apparatus in the same plane in which the first glass panel has run in, it can lean against the row of supporting rollers close to its upper edge and is conveyed up to the same stop and is then congruent and parallel to the first glass panel.

If it is wished to assemble panes of insulating glass which have an irregular outline differing from the rectangular shape, and what is more are perhaps also curved, the exact positioning of the glass panels presents greater difficulties. In automobile construction there is a requirement for curved panes of insulating glass having an outline deviating from the rectangular shape. In the case of this application, an additional handicap is that the panes of insulating glass can—as represented in DE-35 17 581 A1—consist of two glass panels of different sizes, so that the one glass panel projects beyond the edge of the other glass panel.

The object of the invention is to provide an apparatus of the type mentioned at the beginning which is suitable in particular for the assembly of panes of insulating glass which have an outline deviating from the rectangular shape, are curved and are formed by two glass panels of different sizes.

This object is achieved by the apparatus of the instant invention.

Unlike in the case of the known apparatus, the glass panels are not conveyed on one and the same horizontal conveyor against a stop, positioned, bonded and sealed, but instead—if they are, in the usual way, brought along from a washing machine—are loaded by a loading apparatus onto a special horizontal conveyor, which has receiving devices for a plurality of pairs of glass panels, which are moved step-by-step through a plurality of stopping positions. In the receiving devices there are supporting or holding elements for the glass panels, with the aid of which the glass panels are positioned while the horizontal conveyor is stationary and which hold the glass panels while they are conveyed together with them step-by-step through the various stopping positions of the horizontal conveyor. That has the advantage that, while one pair of glass panels is being bonded and sealed, which takes place with the horizontal conveyor stationary, the following pair of glass panels can already be positioned and fixed in a neighboring receiving device of the horizontal conveyor, so that the period of time necessary for this, which is considerably longer than the period of time necessary for the positioning of rectangular, flat glass panels, is not at the expense of the cycle time of the apparatus, instead the cycle time for the assembly of the panes of insulating glass is determined by the operation of bonding and sealing. A further advantage of the invention is that further stopping positions can provided between the stopping position in which the glass panels are bonded to each other and sealed and the stopping position in which the pane of insulating glass thus produced is unloaded, by which further stopping positions the dwell time of the individual pair of glass panels on the horizontal conveyor can be prolonged considerably without prolonging the cycle time of the apparatus. Due to the prolongment of the dwell time, the compound injected between the two glass panels can solidify while still on the horizontal conveyor to such an extent that the pair of glass panels joined to form a pane of insulating glass can be unloaded and put aside by the unloading apparatus without any problems. In this case, the glass panels of the respective pair of glass panels are held very safely and reliably by the same supporting or holding elements during their entire dwell time on the horizontal conveyor, because said elements are moved along with the glass panels.

The supporting and holding elements are preferably arranged on the horizontal conveyor in such a way that the holding areas defined by them run approximately horizontally, that is to say the glass panels are assembled while lying. Assembly is particularly simple with this arrangement. However, in principle it is possible to arrange the glass panel on the horizontal conveyor at a more or less pronounced inclination and to assemble in such an inclined position. The nozzle, which for this purpose injects the pasty compound along the glass panel edge between the glass panels, requires a handling apparatus with adequate freedom of movement in order to be able to move the nozzle in different spatial orientations along a closed space curve, which is predetermined by the shape of the glass panel edge. Particularly suitable for this is a robot with an arm which has a plurality of joints and to the tip of which the nozzle is attached.

A bed or a frame of which the contour is adapted closely to the contour of the glass panel is suitable as supporting or holding element for the lower glass panel of a pair of glass panels. In the bed or the frame, the glass panel can be fixed by its own weight and additionally secured if necessary by suction. Instead of by a bed or a frame, the lower glass panel could also be fixed in the predetermined position by clamping elements acting on the glass panel edge, which are component parts of the receiving devices, moving step-by-step, of the horizontal conveyor.

A plurality of suction cups are preferably provided as supporting or holding elements for the second glass panel, which suction cups are swiveled onto the outside of the second glass panel, suck it into place and then hold it firmly in the predetermined position parallel to the first glass panel. In order to allow the nozzle to pass by unhindered, the suction cups are preferably able to be switched off individually and able to be swiveled into an inactive position away from the holding area coinciding with the outer surface of the glass panel. The remaining suction cups remain in their active position during this time. In order to be able to keep the glass panel in its intended position in spite of the swiveling away of a suction cup, a varying number of suction cups is provided, depending on the size of the glass panel. In the case of small, triangular side panes for automobiles, three suction cups suffice, which are arranged in such a way that they lie in the corner region of the respective glass panel. In the case of larger side panes for automobiles, four suction cups are preferably used, which are likewise expediently arranged in the corner region of the respective glass panel. It can also be accomplished that the nozzle passes by unhindered without swiveling away the suction cups if instead the suction cups for the upper glass panel are attached to a mount which is connected to the horizontal conveyor by a bearing arm and is designed in such a way that it allows a turning of the pair of glass panels in relation to the amount with the suction cups.

If, instead of a bed, a plurality of suction cups are used for the lower glass panel of a pair of glass panels, that has the advantage that the suction cups can be adjusted and consequently adapted to variously shaped glass panels. In addition—unlike in the case of a bed—a hoist can easily be lowered between the suction cups arranged at a distance from each other, with which hoist the lower glass panel is deposited on the carrousel. The suction cups for the lower glass panel do not have to be capable of swiveling away like the suction cups for the upper glass panel. However, like the suction cups for the lower glass panel, the suction cups for the upper glass panel are also preferably adjustable, to be precise they are expediently displaceable transversely to their holding areas on the one hand and variable in their inclination on the other hand, best of all by being fastened to a holder by means of a fixable ball joint.

The same number of suction cups is preferably provided for both glass panels, best of all with said suction cups opposite each other in pairs, as then the construction of the receiving devices for the pairs of glass panels is simplest.

Adjusting the position of the suction cups achieves the effect that the glass panels of a pair of glass panels assume a predetermined distance from each other. That the glass panels also cover each other in a predetermined way is achieved most simply by additional stops for the glass panel edge. If a bed is used for the lower glass panel, such stops are only required for the upper glass panel. If, instead of a bed, a plurality of suction cups are used for the lower glass panel, stops for the glass panel edge are also provided for the lower glass panel, to be precise preferably stops which are separate from the stops for the upper glass panel and can be separately operated, in order that first of all the lower glass panel and then the upper glass panel can be positioned. Once the suction cups have fixed the glass panels after positioning, the stops can be removed again.

In order to facilitate the positioning of the glass panels, the suction cups preferably have within the region which is surrounded by a sealing lip provided on the circumference a plurality of adjustable stops, in particular in the form of rotatably mounted balls, which form an abutment for the glass panel sucked into place and are adapted by adjustment to the contour of the glass panel surface, so that the latter is fixed exactly by the sucking into place and cannot shake.

Suitable as loading and unloading apparatus is a hoist which has on a mount on the one hand fingers for gripping over the lower glass panel and on the other hand, above the fingers, a further gripping device for the upper glass panel. This makes it possible for two glass panels which have already been arranged beforehand at a distance one above the other to be received simultaneously by one and the same hoist, transferred to the horizontal conveyor and deposited there on the corresponding supporting or holding elements. The gripping device for the upper glass panel can likewise be formed by fingers which engage underneath the upper glass panel at the edge, but it is simpler to provide a suction device for the upper glass panel. With such a loading and unloading apparatus, all loading and unloading operations can be carried out, only the suction device being required in the unloading operation for lifting the glass panels then joined to each other.

A carrousel which has supporting or holding elements for the same number of pairs of glass panels as it has stopping positions is suitable as horizontal conveyor for the apparatus according to the invention. On the carrousel, the supporting or holding elements are adapted with respect to their position and alignment to the shape of the glass panels which they are to support or hold respectively. The supporting and holding elements provided for one pair of glass panels each together form the receiving device. The number of receiving devices corresponds to the number of stopping positions. If the receiving devices provided on the carrousel are designed identically to one another, the apparatus is suitable in particular for the continuous assembly of panes of insulating glass which are identical to one another. If the receiving devices provided on the carrousel are designed differently, the apparatus is suitable in particular for the continuous assembly of a limited number of different panels of insulating glass. Both variants can be used with advantage for the manufacture of panels of insulating glass for automobiles, since large numbers of few types of panes of insulating glass are required there.

If the carrousel has precisely two stopping positions and two receiving devices, the loading and unloading apparatus is expediently assigned to the first stopping position and the handling apparatus with the nozzle is expediently assigned to the second stopping position; in this way, while the strand of pasty compound is being injected between two glass panels in the second stopping position, the previously assembled pane of insulating glass can be unloaded in the first stopping position and the carrousel loaded with the pair of glass panels to be assembled next. In this way, the loading and unloading operations take place while the operation which takes longest in the assembly of the pane of insulating glass is going on.

Another favorable possibility is to provide a carrousel with precisely three stopping positions and three receiving devices, the first stopping position being assigned the loading apparatus, the second stopping position being assigned the handling apparatus with the nozzle and the third stopping position being assigned the unloading apparatus. In comparison with a carrousel with two stopping positions, the carrousel with three stopping positions has the advantage that loading and unloading can be carried out simultaneously and, as a result, the cycle time of the apparatus can be reduced. In addition, the loading apparatus and the unloading apparatus, if separate apparatuses are involved, can be arranged at a greater distance from each other, so that they have a greater freedom of movement.

In order to avoid revolving couplings for the numerous supply lines to the supporting and holding elements and to the sensors monitoring and controlling them, the carrousel is preferably operated back and forth. A carrousel with three stopping positions is expediently turned twice through 120° in one direction and then through 240° in the opposite direction and so on. A carrousel with three stopping positions allows a longer dwell time on the carrousel for the respective pair of glass panels than a carrousel with only two stopping positions. A longer dwell time of the sealed panes of insulating glass without an overall prolongment of the cycle time of the apparatus is desirable because the sealed pane of insulating glass can be handled all the better by the unloading apparatus the harder the initially pasty compound has become by the time of the unloading operation. In an advantageous further development of the invention, it may therefore be provided that there lies between the stopping position which is assigned the handling apparatus with the nozzle and the stopping position which is assigned the unloading apparatus a further stopping position, which is assigned an apparatus accelerating the hardening of the initially pasty compound. How this apparatus accelerating the hardening operates depends on the nature of the compound used. If it is a two-component adhesive, for example a thiokol, the hardening can be accelerated by a heat treatment, which may be carried out by means of infrared heaters. If the hardening compound is a synthetic resin in which the reaction accompanying the hardening can be accelerated by UV irradiation, UV lamps may be provided in the region of the additional stopping position of the carrousel.

If a rotary table, outside the periphery of which the loading and unloading apparatuses and the handling apparatus with the nozzle are arranged, is used the carrousel, that has the advantage that the carrousel is simple and compact in construction. If, instead, a carrousel, in particular a carrousel of ring-shaped design, which is large enough that the handling apparatus with the nozzle can be arranged in the central region of the carrousel is used, the advantage is obtained that, due to the greater circumference of the carrousel, a greater number of stopping positions can be provided on the same, which has the consequence of a longer dwell time of the pair of glass panels on the carrousel, benefiting the hardening of the pasty compound, the apparatus in turn being relatively compact, bearing in mind the greater number of stopping positions, due to the central arrangement of the handling apparatus. On such a ring-shaped carrousel, all the actuating elements and control elements for the supporting or holding elements are preferably arranged so as to run with the carrousel, so that for these many elements only a few supply lines have to be led into the carrousel in order to supply them with energy; for these supply lines—expediently an electric supply cable and a compressed-air supply line—it is best of all to provide a revolving coupling in the central region of the carrousel.

The guidance of the receiving devices for the pairs of glass panels does not have to be particularly exact on such a carrousel. Two coaxial ring rails which guide the receiving devices, connected movably relative to one another, with enough clearance that a smooth running of the receiving devices on the carrousel is possible without maintaining special dimensional tolerances are sufficient. However, a precise alignment and fixing of the pairs of glass panels in the stopping position which is assigned the handling apparatus with the nozzle is recommendable, in order that the running of such handling apparatus around the pair of glass panels is not impaired by positional inaccuracies. Therefore, means which do not run with the carrousel, for example index pins, are expediently provided in the latter stopping position of the carrousel, by which means the pairs of glass panels are aligned and fixed in this stopping position. These index pins can engage for example in bores of a mounting plate on which the supporting or holding elements for the glass panels are attached.

Instead of a carrousel, a linear conveyor with a series of receiving devices for pairs of glass panels, which can be jointly moved forward and backward by the sum of their step sizes may also be used as horizontal conveyor. The step size of a receiving device is understood as meaning the distance which the respective receiving device travels from the first stopping position, which is assigned the loading apparatus, to the second stopping position, which is assigned the handling apparatus with the nozzle. It is simplest when the step size is the same for all the receiving devices. However, it is an advantage of the apparatus operating with the linear conveyor that the receiving devices can vary in their step size. This makes it possible to provide receiving devices for pairs of glass panels of various sizes in closest possible succession on the linear conveyor, so that the length of the linear conveyor is minimized for a given succession of receiving devices. In this way it is possible for example to provide the linear conveyor with receiving devices for the various side panes of an automobile. However, it is of course equally possible to provide the linear conveyor with receiving devices identical to one another and to process a series of identical pairs of glass panels, it being possible to change over the receiving devices for the processing of a series of different pairs of glass panels.

A major advantage of the apparatus operating with the linear conveyor in comparison with an apparatus operating with a carrousel is that the dwell time of the pairs of glass panels in the apparatus which the pasty compound requires to harden to such an extent that the bonded pairs of glass panels are easy to handle is achieved with less complex equipment and without any loss in cycle time. In order nevertheless to keep the length of the linear conveyor as small as possible, it is recommendable to arrange and design the receiving devices in such a way that the pairs of glass panels lie with their greatest extent transverse to the conveying direction. It is particularly favorable to arrange two linear conveyors in parallel next to each other and to serve them with a handling apparatus with nozzle, in particular with a robot, which is located between the two linear conveyors. As a result, with a given length of the linear conveyor, the dwell time can be doubled or, with a given dwell time, the length of the linear conveyor can be halved. With this apparatus, it is then possible for example to operate in such a way that the handling apparatus with the nozzle alternately bonds and seals a pair of glass panels on one linear conveyor and then a pair on the other linear conveyor, and that a loading and unloading operation takes place on the one linear conveyor when a pair of glass panels is being bonded and sealed on the other linear conveyor. However, it is also possible to load and seal a series of pairs of glass panels on one linear conveyor and during this time to leave a previously processed series of pairs of glass panels on the other linear conveyor.

Exemplary embodiments of the invention are represented diagrammatically in the attached drawings.

Figure 2:
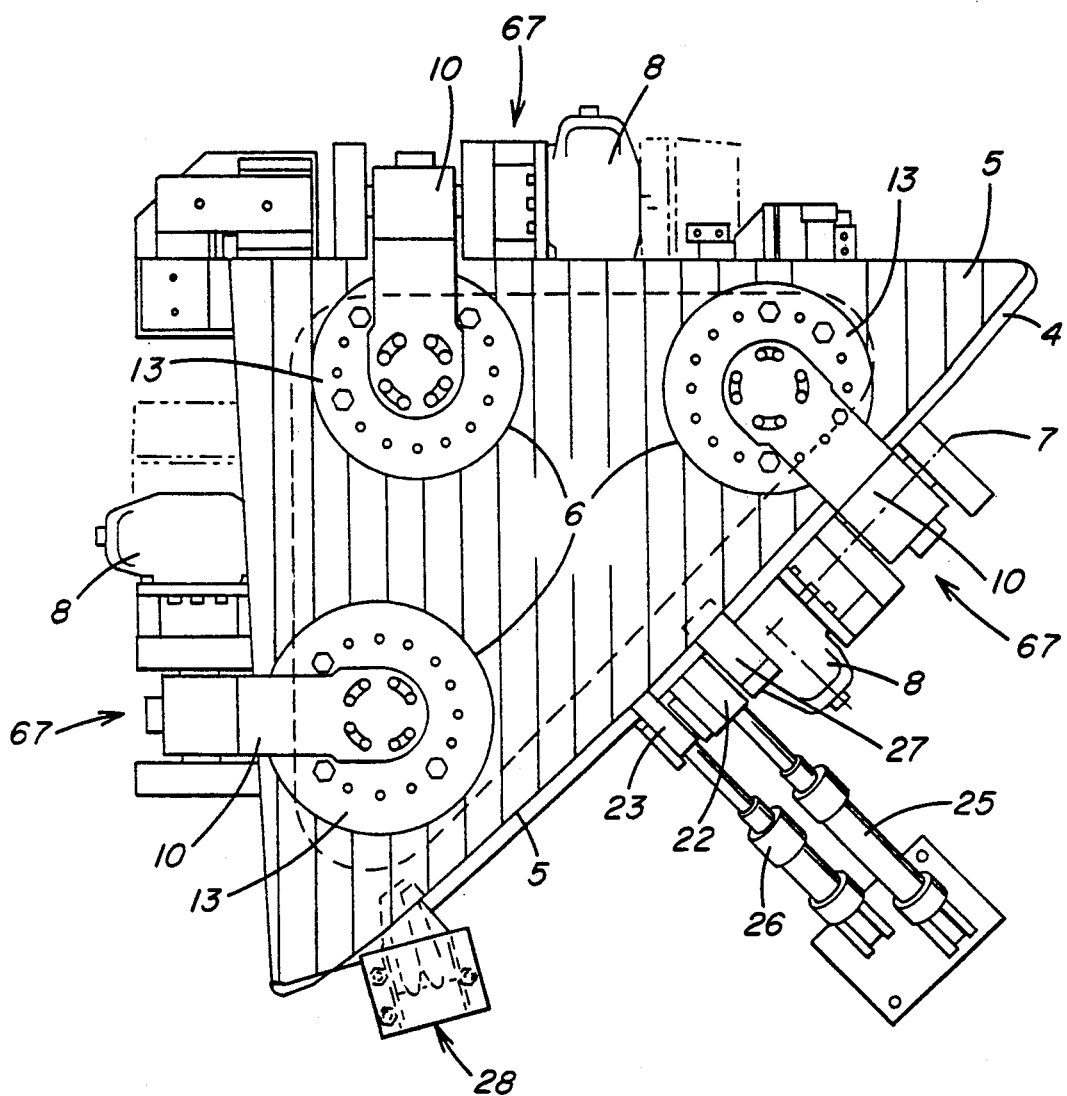
Figure 3:
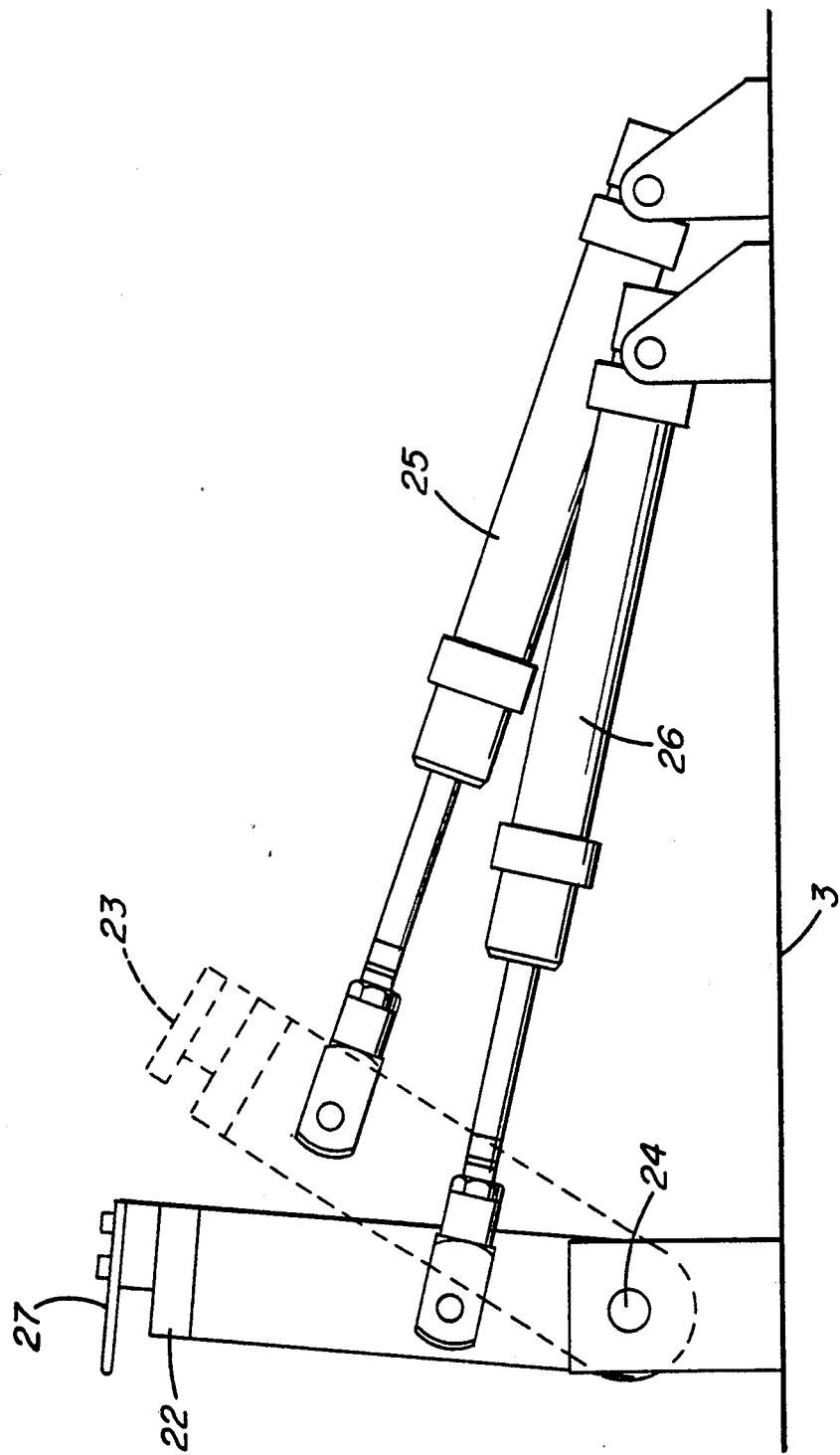
Figure 4:
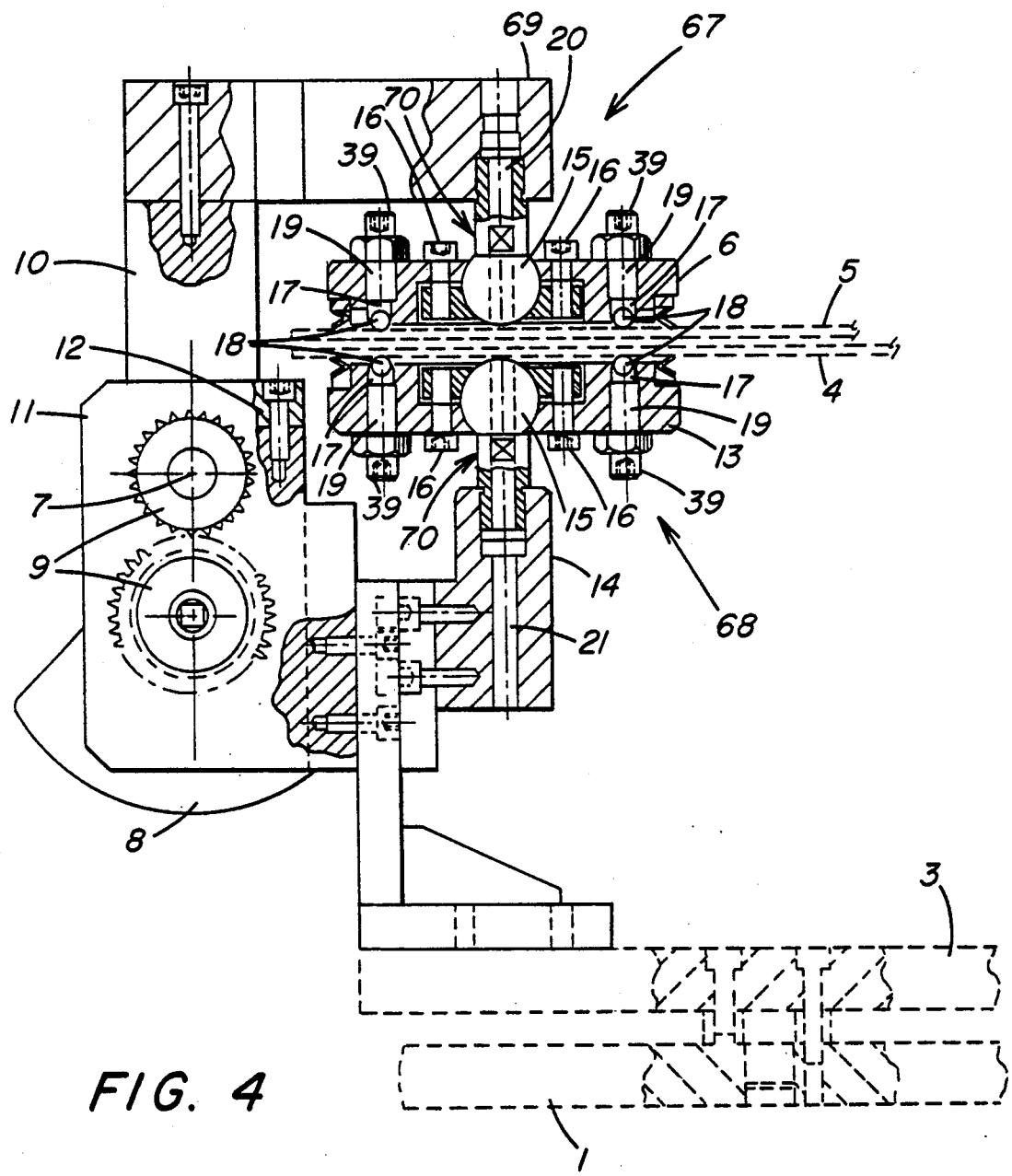
Figure 5:
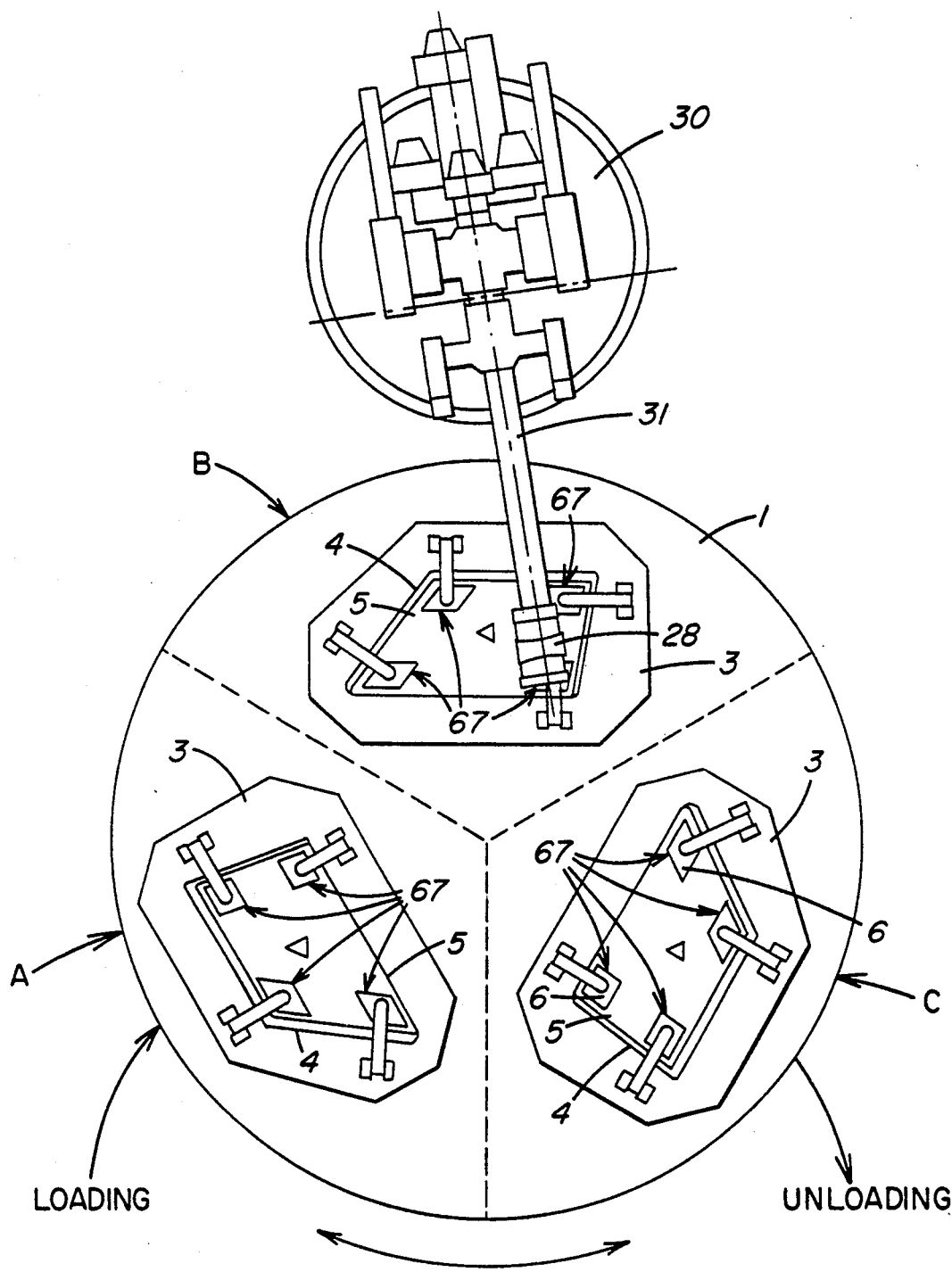
Figure 6:
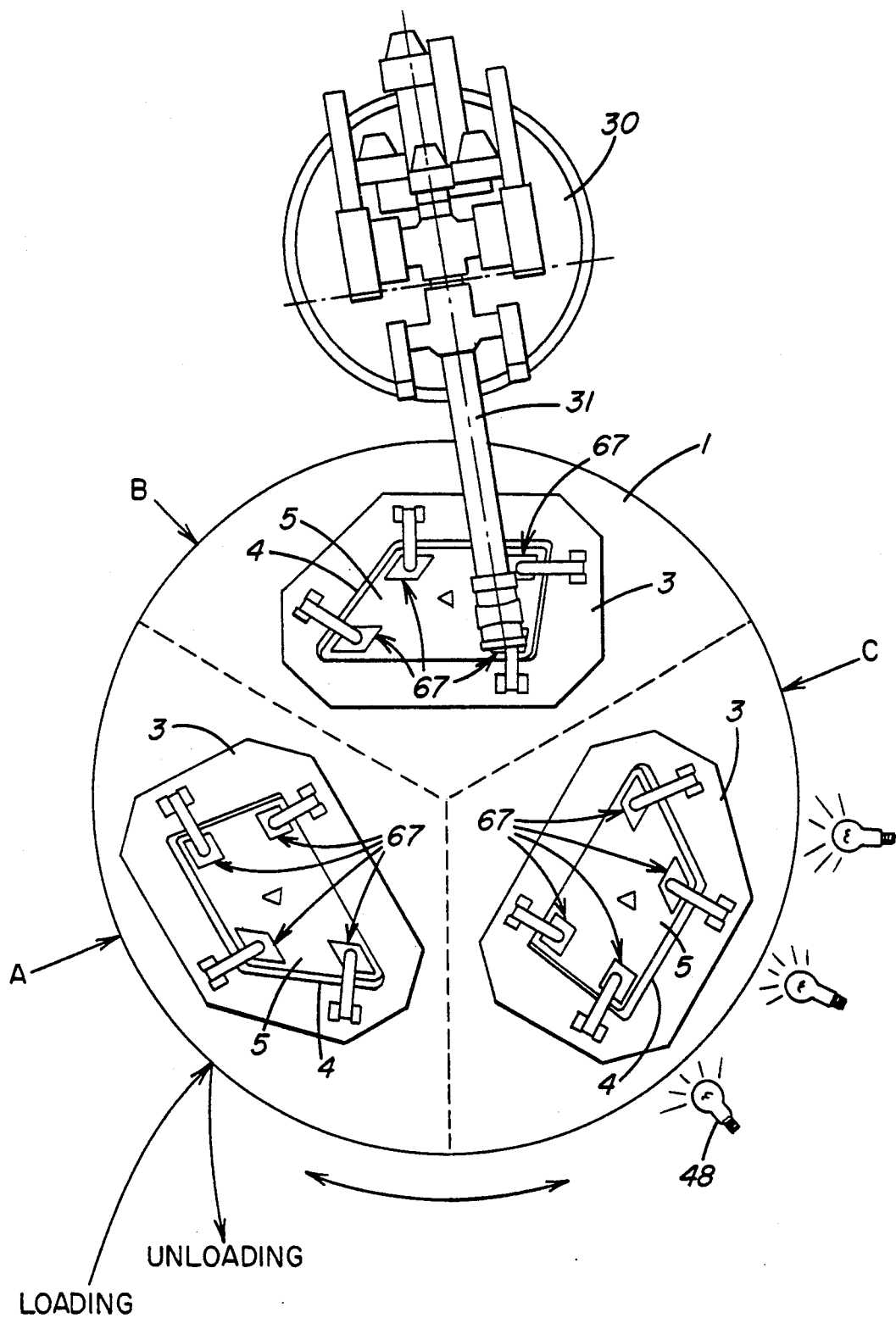
Figure 7:
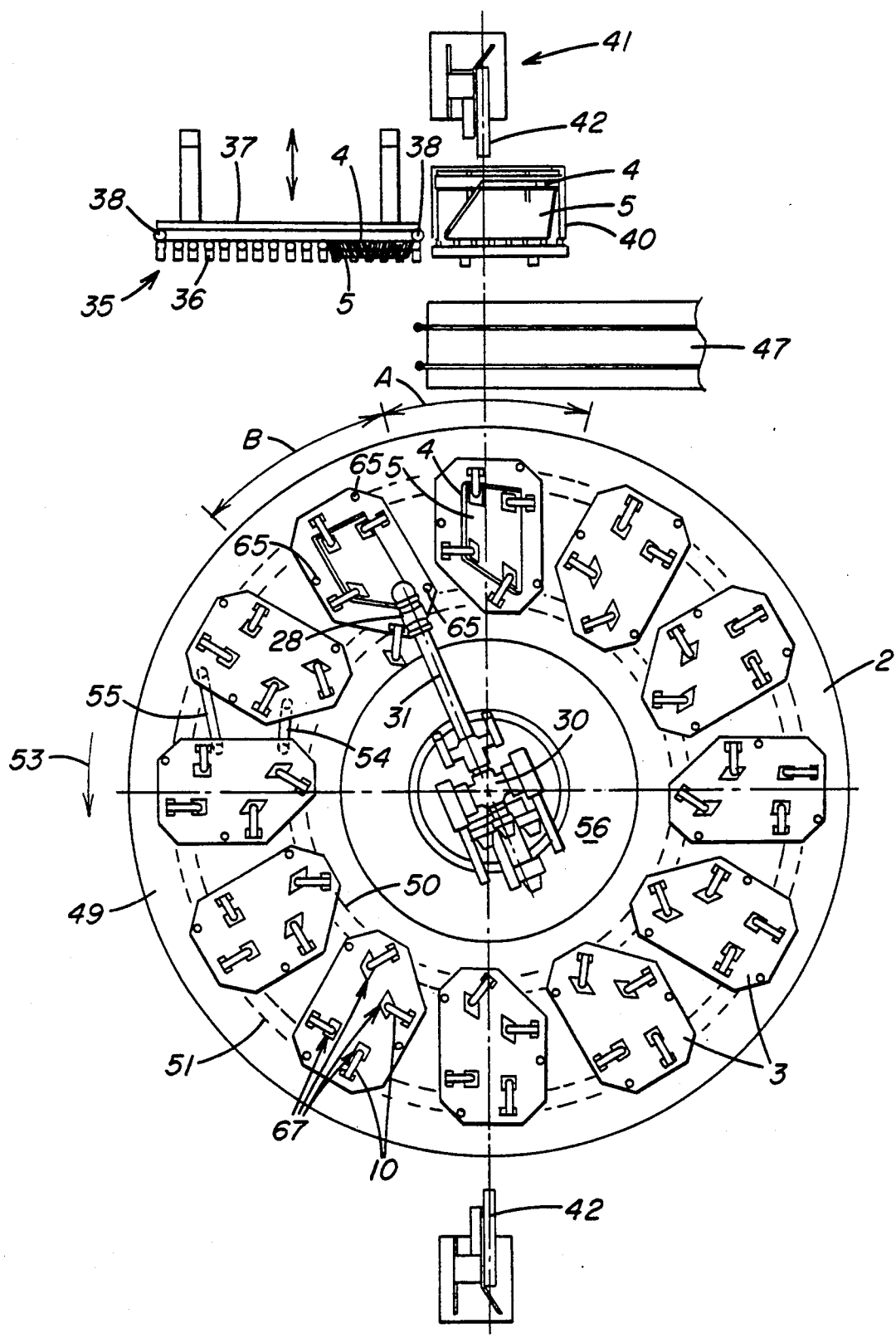
Figure 8:
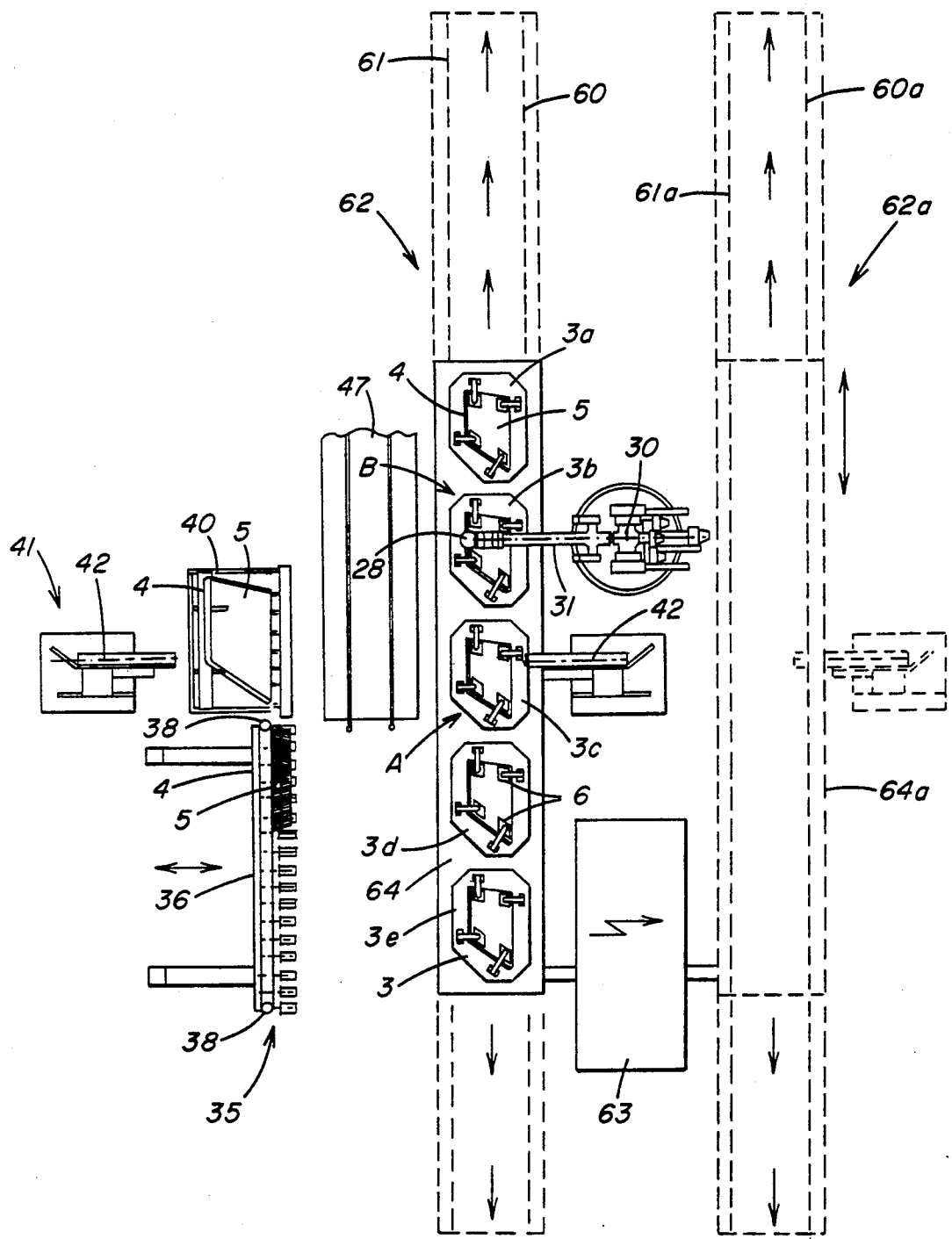
Figure 9:
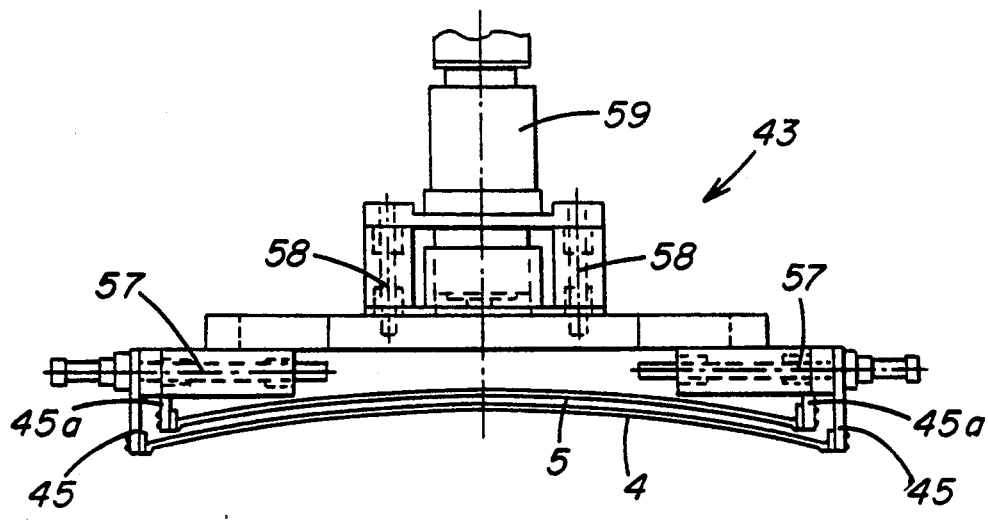
Figure 10:
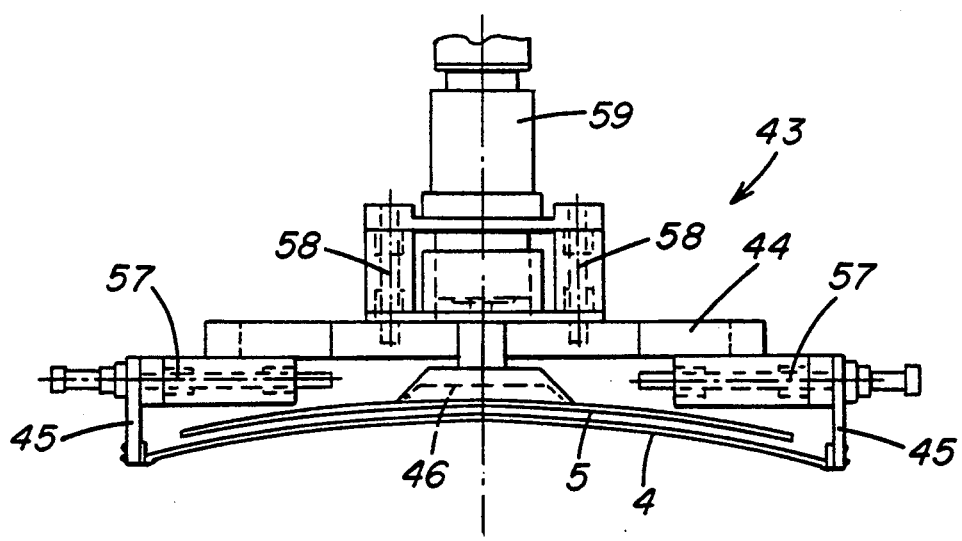

FIG. 1 shows an apparatus for joining two glass panels, operating with a rotary table, in plan view, FIG. 2 shows, as a detail from FIG. 1, the plan view of the supporting and holding elements for a pair of glass panels, but unlike FIG. 1 not in the example of rectangular glass panels but in the example of triangular glass panels, FIG. 3 shows, as a detail from FIG. 2, two movable stops for the glass panel edge, in side view, FIG. 4 shows, partly in side view and partly in vertical section, the construction and arrangement of two suction cups, FIG. 5 shows a second exemplary embodiment of an apparatus with a rotary table with three stopping positions, FIG. 6 shows, as third exemplary embodiment, an apparatus with a rotary table with three stopping positions, one of which serves for heat treatment, FIG. 7 shows, as fourth exemplary embodiment, an apparatus with a ring-shaped carrousel, in plan view, FIG. 8 shows, as fifth exemplary embodiment, an apparatus operating with one or two linear conveyors, in plan view, FIG. 9 shows, in side view, a hoist as a component part of a loading and unloading apparatus, and FIG. 10 shows, in a representation such as in FIG. 9, another exemplary embodiment of a hoist.

The apparatus represented in FIG. 1 has a carrousel 1 in the form of a rotary table 2 with vertical axis of rotation, which is rotatable in steps of 180° in both directions of rotation. On the carrousel there are two diametrically opposite receiving devices, formed by mounting plates 3 with upper supporting or holding elements 67 each having an upper suction cup 6 and lower supporting or holding elements 68 each having a lower suction cup 13 as clearly shown in FIG. 4, for in each case arranged two glass panels 4 and 5 arranged one above the other. In FIG. 1 each plate 3 is shown having four upper supporting or holding elements 67 with each element 67 as shown in FIG. 4 having a suction cup 6 fastened to swivel arms 10 for supporting or holding the upper glass panel 5. As FIG. 4 shows in detail, these suction cups 6 are fastened on the mounting plate 3 and can be swiveled about a horizontal axis 7 only one shown in FIG. 2. The swiveling takes place by means of a pneumatic rotary piston drive 8, which, with a toothed-wheel gearing 9 interposed (see FIG 4), swivels an arm 10, which holds the suction cup 6. With reference to FIG. 4, screwed onto the gearing case 11 is a fixed stop 12, against which the arm 10 strikes when the suction cup 6 is swiveled into its active position into engagement with the upper glass panel 5.

With continued reference to FIG. 4, arranged opposite the suction cups 6 for the upper glass panel 5, and fastened on the mounting plate 3, are an equal number of suction cups 13 for the lower glass panel 4. The suction cups 6 and 13 are designed identically to one another and are fastened to their respective holder 69 or 14 by means of a respectively ball joint 70. For this purpose, each ball joint 70 has a ball head 15, which lies in a hemispherical recess of the suction cup and can be firmly clamped by clamping screws 16. After releasing the clamping screws 16, the inclination of the suction cups 6 and 13 can be changed.

The suction cups have in each case an annular sealing lip 17 and, within the region surrounded by the sealing lip, a number of balls 18 of hard rubber, distributed at regular intervals around the circumference of the suction cup, which balls are mounted freely rotatably in cages which are attached to the tip of adjusting screws 19. The balls 18 serve as stops for the glass panels 4 and 5 when the latter are sucked into place. In order that the glass panels 4 and 5 assume an exactly predetermine position and do not shake, the balls 18 can be adjusted by rotating heads 39 or adjusting screws 19, so that their position can be adapted precisely to the contour of the glass panel surface.

The holders 69 and 14 have in each case a bore 20 and 21, which extends through the ball head 15; these bores 20 and 21 are connected to a suction unit (not shown) via valves (not shown) which can be actuated separately.

For the assembly of a relatively large side pane an automobile, expediently there are four upper supporting or holding elements 67 each having a suction cup 6 and there are four lower supporting or holding elements 68 each having a suction cup 13 are used for each of both glass panels 4 and 5 of a pair of glass panels, in an arrangement as shown in FIG. 1. For a smaller, triangular side pane of an automobile, there are three upper supporting or holding elements 67 each having a suction cup 6 and there are three lower supporting and holding elements 68 each having a suction cup 13 respectively for each of the two glass panels 4 and 5 are sufficient. The arrangement of the suction cups 6 for a triangular pane is shown by way of example in FIG. 2. The suction cups and the manner in which they are attached to the mounting plate 3 coincide with the representation in FIG. 4.

FIG. 2 shows in, addition, stops for the edge of the two glass panels 4 and 5. Such stops 22 and 23 are expediently provided for each of the glass panel edges, that is to say in the examples represented between two suction cups 6 or 13 each. The stops for the various glass panel edges are in principle constructed identically and are therefore described in further detail by the example of a group of two stops for the mutually corresponding edges of the two glass panels 4 and 5 with reference to FIGS. 2 and 3.

In each case a stop 22 for the lower glass panel 4 and a stop 23 for the upper glass panel 5 is provided. Both stops are attached on the mounting plate 3 so as to swivel about a horizontal axis 24; in order to swivel them, in each case a compressed-air cylinder 25 and 26, respectively, is provided. Next to the stop for the lower glass panel 4 a projection 27 is also provided, which is swiveled together with the stop 22 and lies on the upper side of the lower glass panel 4 when the stop 22 bears against the edge of the glass panel 4. This projection 27 serves as spacer between the lower glass panel 4 and the upper glass panel 5 until the upper glass panel 5 is positioned and fixed by the suction cups 13.

With reference to FIG. 1, the carrousel has two stopping positions A and B, which can be reached alternately by turning through 180° clockwise or counterclockwise. Next to the stopping position B of the carrousel 1 there is a robot 30, which bears on its articulated arm 31 a sealing nozzle 28, with which the pasty compound which bonds the two glass panels to each other and seals the space formed between them is injected between the glass panels 4 and 5 located in the stopping position B. In the position A, the carrousel 1 is loaded and unloaded. Consequently, the following operating steps recur:

unloading and loading in A, at the same time injection in B;
rotating the table counterclockwise as viewed in FIG. 1;
unloading and loading in A, at the same time injection in B;
rotating the table clockwise as viewed in FIG. 1.

In the following exemplary embodiments, parts which correspond to parts of the first exemplary embodiment have been denoted by the same reference numerals.

In the case of the exemplary embodiment represented in FIG. 5, only one carrousel 1 is provided, but unlike the previous example with three stopping positions A, B and C, which can be moved into by rotations through 120° or through 240° clockwise or counterclockwise. The robot 30, which bears the nozzle 28 on its arm 31, is arranged in the vicinity of the stopping position B. The carrousel is loaded in the stopping position A and unloaded in the position C. If revolving couplings are provided for the required supply lines of the carrousel, the carrousel can be turned progressively in the same direction. Otherwise, there is the possibility of proceeding as follows:

loading in A, at the same time injection in B and unloading in C;
rotating the table clockwise as viewed in FIG. 5 through 120°;
loading in A, at the same time injection in B and unloading in C;
rotating the table clockwise as viewed in FIG. 5 through 120°;
loading in A, at the same time injection in B and unloading in C;
rotating the table counterclockwise as viewed in FIG. 5 through 240°;
loading in A, at the same time injection in B and unloading in C;
rotating the table counterclockwise as viewed in FIG. 5 through 120°;
etc.

In the case of the exemplary embodiment represented in FIG. 6, a carrousel 1 and an arrangement of the robot 30 as in the exemplary embodiment in FIG. 5 are used. The difference from the example in FIG. 5 is that the loading and unloading take place in the stopping position A, and that in the stopping position C instead a heat treatment of the panes of insulating glass takes place, in order to accelerate the hardening of the compound injected in. Three heaters 48 for the heat treatment are drawn in diagrammatically.

In the first three exemplary embodiments, it has been left open how the loading and unloading take place in detail. A loading and unloading apparatus which can be used for all the exemplary embodiments is represented in FIGS. 7 to 10 and is described in conjunction with them.

The fourth exemplary embodiment represented in FIG. 7 has as horizontal conveyor a rotating table 2 which is arranged in the form of a ring and has a base 49 with two concentric ring rails 50 and 51, on which mounting plates 3 are arranged at regular intervals, which mounting plates have, as in the previous exemplary embodiments, the supporting or holding elements for the glass panels 4 and 5, of which elements the suction cups 6 for the upper glass panel 5 are shown. The mounting plates 3 run on rollers (not shown) and are guided by the ring rails 50 and 51. The mounting plates 3 are connected to each other by control arms 54 and 55 and have holes 65, by means of which they can be exactly positioned and fixed in the stopping position B; for this purpose, on the base 49 there are pins provided, which can be slid up in the stopping position B and engage in the holes 65 when they are pushed up.

In the central region 56 surrounded by the rotating table 2 there is a robot 30 with an articulated arm 31, at the tip of which is the nozzle 28 with which the pasty compound is injected between the two glass panels 4 and 5.

For feeding the glass panels 4 and 5, a horizontal conveyor 35 shown in FIGS. 7 and 8 is provided, on which the glass panels stand upright on rollers 36 and lean with their upper edge against an endless conveyor belt 37, which is led around deflection rollers 38 with approximately vertical axis. Ahead of the conveyor belt 37 there is provided a beam, which can moved up and down, with a row of supporting rollers, which allow a further glass panel 5 to be arranged and conveyed parallel to the glass panel 4 which bears against the conveyor belt 37. The way in which two glass panels can be brought into congruent alignment with a distance in between on such a conveyor is disclosed in DE-35 39 877 A1, to which reference is hereby made. The horizontal conveyor 35 is followed by a further horizontal conveyor 40, which is constructed similarly in principle to the horizontal conveyor 35 but can be tilted about a horizontal axis, so that the glass panels 4 and 5 which are located on it can be tilted into a horizontal position. For lifting the glass panels 4 and 5 over from the tilted horizontal conveyor 40 to the rotating table 1 and 2, a combined loading and unloading apparatus 41 is provided; this comprises a cross member 42, which extends over the horizontal conveyor 40 and the rotating table 2. A hoist is mounted movably on this cross member 42 and is represented by way of example in FIG. 10.

The hoist 43 represented in FIG. 10 has a mount 44, by which it is suspended on the cross member 42 of the loading and unloading apparatus. On the mount 44 there are a plurality of fingers 45, which can be displaced by pressure-medium cylinders 57 and can grip underneath the lower glass panel 4. Furthermore, attached to the mount 44 is a suction device 46, which serves for grasping the upper glass panel 5. Further pressure-medium cylinders 58 allow a raising or lowering of the mount 44 relative to its suspension 59.

A conveying apparatus 47, on which the finished panes of insulating glass are deposited by the hoist and which conveys the panes of insulating glass to a stacking apparatus, is arranged between the rotating table 2 and the horizontal conveyor 40.

The apparatus operates as follows:

Two glass panels 4 and 5, brought along on the horizontal conveyor 35 and positioned in parallel next to each other, are conveyed onto the horizontal conveyor 40, which is thereupon tilted into a horizontal or approximately horizontal position. In this position, the two glass panels 4 and 5 are raised jointly by the hoist 43 and conveyed over the stopping position of the rotating table 2, where they are lowered until the lower glass panel 4 lies on the suction cups 13 (FIG. 4). Then, the fingers 45 of the hoist 43 are released from the lower glass panel 4 and the stops 22 are swiveled up; they come into contact with the edges of the lower glass panel 4 and position them (FIG. 2 and FIG. 3). At the same time, as a result the projections 27 are swiveled up, which projections serve as temporary spacers between the two glass panels 4 and 5. The upper glass panel 5 can then be released from the suction device 46 and the hoist 43 raised. The upper suction cups 6 are swiveled onto the glass panel 5 and the further stops 23 are swiveled up, as a result of which the upper glass panel 5 is positioned. Lateral displacement movements of the glass panels 4 and 5 are easily possible due to the balls 18 in the suction cups 6 and 13 (FIG. 4). Once the glass panels 4 and 5 are positioned, they are sucked into place by the suction cups 6 and 13 and thereby fixed. The stops 22 and 23 can then be removed.

Subsequently, the rotating table 1 is turned through one step in the direction of the arrow 53. As a result, the mounting plate 3 previously in the stopping position A goes into the neighboring stopping position B and consequently into the operating area of the robot 30, which then introduces the nozzle 32 into the intermediate space between the two glass panels 4 and 5 and begins to take the nozzle 32 around the pair of glass panels. Each time the nozzle 32 approaches one of the suction cups 6, which can be indicated by sensors or by a fixed control program, the corresponding suction cup 6 is depressurized and swiveled away from the glass panel 5, so that the nozzle 32 can pass by unhindered. After the nozzle has passed by, the respective suction cup 6 is swiveled back into its active position and activated i.e. the suction cup 6 engages the glass panel 5 and is secured thereto by pulling a vacuum through the base 20 (see FIG. 4) by a suction unit (not shown).

While the pair of glass panels is being bonded to each other in the stopping position B, a pane of insulating glass assembled beforehand on the rotating table 2 is removed in the stopping position A and deposited on the conveying apparatus 47 by means of the loading and unloading apparatus 41 and a further pair of glass panels is fetched from the horizontal conveyor 40 and deposited in the stopping position A, positioned and fixed; as soon as the robot 30 has bonded the pair of glass panels in the holding position B completely to each other, the rotating table 2 is turned through a further step in the direction of the arrow 53 and the operations described are repeated. On the way from the stopping position B in the direction of rotation 53 to the stopping position A, the compound injected between the glass panels has an opportunity to solidify, it being possible for the solidifying to be accelerated for example by a heat treatment in one or more of the further stopping positions lying between the stopping position B and the stopping position A.

The exemplary embodiment represented in FIG. 8 has, instead of a carrousel, a linear conveyor 62, which has a carrier 64, which can be displaced on rails 60 and 61 and on which there is a series of mounting plates 3, one behind the other, which have, as in the previous exemplary embodiments, the supporting and holding elements for the glass panels 4 and 5, of which the suction cups 6 for the upper glass panel 5 are represented.

The stopping position A is assigned the loading and unloading apparatus 41. Directly alongside the stopping position A is the stopping position B, which is assigned the robot 30 with the nozzle 28.

In the example drawn, there are on the linear conveyor 62 five mounting plates 3, which can be moved jointly forward and back.

A complete operating cycle proceeds as follows:

First of all, the forwardmost mounting plate 3a, which together with the supporting and holding elements located thereupon forms a receiving device for a pair of glass panels, is loaded with a pair of glass panels in the stopping position A. Then, the five mounting plates are moved jointly forward by one step, so that the front mounting plate 3a is in the stopping position B next to the robot 30. In this position, the pair of glass panels is bonded in the stopping position B and the next pair of glass panels is loaded onto the mounting plate 3b in the stopping position A. These operating cycles are repeated until the final mounting plate 3e lies in the stopping position B and the pair of glass panels located thereupon is bonded. Then, the five mounting plates are moved back all at once, until the forwardmost mounting plate 3a is back in the stopping position A. In this position, the pair of glass panels is unloaded from the receiving device formed on the mounting plate 3a and a new pair of glass panels is loaded. Then, the five mounting plates are advanced jointly by one step, so that the mounting plate 3a lies in the stopping position B, and, while the pair of glass panels is being bonded in the stopping position B, the finished pane of insulating glass is unloaded and a new pair of glass panels is loaded in the stopping position A. The following operating steps proceed correspondingly.

The dwell time of the glass panels in the apparatus can be increased not only by providing a greater number of receiving devices on the linear conveyor 62, but also by arranging next to the linear conveyor 62 a further linear conveyor 62a parallel to the first linear conveyor 62, the robot 30 being located between the two linear conveyors. This variant is represented by broken lines in FIG. 8. Both linear conveyors 62 and 62a are expediently constructed identically. In this case, the cross member 42 of the loading and unloading apparatus extends over both linear conveyors.

Such an apparatus with two linear conveyors can be operated in such a way that first of all an entire series of pairs of glass panels are bonded to each other on the first linear conveyor 62 and then the nozzle 32 of the robot is swiveled to the second linear conveyor 62a and a complete series of pairs of glass panels is loaded and bonded there, while the mounting plates on the first linear conveyor are moved back into their initial position and remain there until all the pairs of glass panels on the second linear conveyor 62a have been bonded to each other.

Another possibility for the mode of operation is that the loading and unloading and the bonding of pairs of glass panels is carried out from individual case to individual case alternately in one instance on one linear conveyor 62 and in the other instance on the other linear conveyor 62a.

In the exemplary embodiment represented, the power supply and control equipment are arranged in a housing 62 between the two linear conveyors.

FIG. 9 shows a hoist which is modified in comparison with FIG. 10 and in which, unlike the exemplary embodiment in FIG. 10, the upper glass panel 5 cannot be grasped by a sucker but, like the lower glass panel 4, by a plurality of fingers 45a which can be displaced by pressure-medium cylinders.

I claim:

1. An apparatus for joining two glass panels to form a pane of insulating glass bonded at the edges by a strand of an adhesive compound which is initially pasty and subsequently solidifies to adhere the two glass panels together at their marginal edges to form the pane of insulating glass, comprising:

a plate having a panel receiving position;

means for loading a pair of panels with a major surface of one panel defined as the upper panel in facing relationship to the major surface of the other panel defined as the lower panel in said panel receiving position;

a lower supporting or holding element mounted n said plate at said panel receiving position for engaging said lower panel;

a plurality of upper supporting or holding elements, each of said upper supporting or holding elements having a panel engaging means;

means for mounting said upper elements on said plate for moving said upper elements toward said panel receiving position into an activated position where said panel engaging means engages the upper panel, and for moving said upper element into a non-activated position by disengaging said panel engaging means and said upper panel and by moving said upper element away from said panel receiving position, wherein when said upper elements are in the activated position, said upper panel is maintained in a fixed spaced relationship to said lower panel;

means for injecting a strand of adhesive compound between marginal edges of said spaced panels;

means for moving said plate into a panel loading position, out of said panel loading position, into a sealing position, out of said sealing position, and into an unloading position;

means responsive to said moving means for activating said loading means when said plate is in said loading position to position the panels on said panel receiving position; for selectively moving said plurality of upper elements into the activated position, and for engaging said lower panel by said lower element; and means for activating said injecting means when said plate is in said sealing position to inject a strand of compound between said panels while selectively and sequentially moving one of said upper elements into the non-activated position to allow said injecting means to move past said one of said upper element in said non-activating position and for moving said upper element respectively from said non-activated position into said activated position as the injecting means move away from said one of said upper element in said non-activated position.

2. The apparatus as in claim 1, wherein said means for moving said upper elements moves said plurality of upper elements individually or in groups between the activated and non-activated positions.

3. The apparatus as in claim 1, wherein said lower element is a bed of which the contour is adapted closely to the contour of the lower glass panel.

4. The apparatus as claimed in claim 1, wherein said surface engaging means of each of said upper elements is a suction cup.

5. The apparatus as in claim 4, wherein said lower element includes a plurality of suction cups (13).

6. The apparatus as claimed in claim 5, wherein ones of said suction cups (6) of said upper element lie opposite respective ones of said suction cups (13) of said lower element.

7. The apparatus as claimed in claim 4, wherein each of the suction cups has an engaging surface and the inclination of the engaging surfaces of the suction cups (6, 13) with respect to its respective panel is adjustable.

8. The apparatus as claimed in claim 7, wherein each of the suction cups (6, 13) are fastened to a holder (69, 14) by means of a fixable ball joint (70).

9. The apparatus as claimed in claim 4, wherein the suction cups (6, 13) are adjustable transversely to their respective holder (69, 14).

10. The apparatus as claimed in claim 4, further including aligning means having stops (22, 23) for positioning the glass panels (4, 5) in the panel receiving position prior to engagement of said panels by said upper and lower elements, which stops are moveable toward and away from edges of the glass panels.

11. The apparatus as claimed in claim 10, wherein a stop (22, 23) is provided for each of said upper and lower glass panels (4, 5).

12. The apparatus as claimed in claim 11, wherein one of said stops has a projection (27) which projection moves into the space between the panels when the said stop moves toward said panels.

13. The apparatus as claimed in claim 1, further including means for moving said plate into said unloading position and wherein said loading means (41) includes means for unloading the pane of insulating glass from said plate.

14. The apparatus as claimed in claim 1, wherein the loading means (41) has a hoist (43) with a mount (44), to which fingers (45) for engaging underneath the lower glass panel (4) and, above the fingers (45), a further grasping device (46) for the upper glass panel (5) are attached in a suspended manner.

15. The apparatus as claimed in claim 14, wherein said grasping device includes a plurality of fingers which grip underneath the upper glass panel (5).

16. The apparatus as claimed in claim 14, wherein said grasping device (46) includes a suction device.

17. The apparatus as claimed in claim 1, wherein said injecting means includes a robot with an articulated arm (31), at the tip of which a nozzle (32) is attached.

18. The apparatus as claimed in claim 1, wherein said moving means is a carrousel (1).

19. The apparatus as claimed in claim 18, wherein the carrousel (1) has two stopping positions (A, B), the first stopping position (A) is the panel loading and unloading positions and the second stopping position (B) is the sealing position.

20. The apparatus as claimed in claim 18, wherein the carrousel (1) has three stopping positions (A, B, C), the first stopping position (A) is said loading position, the second stopping position (B) is the sealing position and the third stopping position (c) is the unloading position.

21. The apparatus as claimed in claim 18, wherein said moving means moves said plate through at least three stopping positions (A, B, C) and wherein said at least one further stopping position (C) lies between the stopping position (B) which is said sealing position and the stopping position (A) which is the unloading position.

22. The apparatus as claimed in claim 21, wherein the further stopping position (C) includes means for accelerating the hardening of the initially pasty compound.

23. The apparatus as claimed in claim 18, wherein the carrousel (1) has a central region and said injecting means is arranged in the central region (56) of the carrousel (1).

24. The apparatus as claimed in claim 23, wherein two coaxial ring rails (50, 51) are provided on said carrousel for receiving said plate.

25. The apparatus as claimed in claim 1, wherein said means for moving is a linear conveyor (62) with a series of receiving devices, which can be moved jointly forward and backward by the sum of their step sizes.

26. The apparatus as claimed in claim 1 further including aligning means for aligning and fixing said plate are provided in the sealing position.

* * * * *

UNITED STATES PATENT AND TRADEMARK OFFICE
CERTIFICATE OF CORRECTION

PATENT NO. : 5,167,756

DATED : December 1, 1992

INVENTOR(S) : Karl Lenhardt

It is certified that error appears in the above-identified patent and that said Letters Patent is hereby corrected as shown below:

Column 13, line 23, "n" should be "on.

Signed and Sealed this

Eighth Day of February, 1994

*Attest:*

BRUCE LEHMAN

*Attesting Officer*     Commissioner of Patents and Trademarks